(12) United States Patent
Schaser et al.

(10) Patent No.: US 8,454,290 B2
(45) Date of Patent: Jun. 4, 2013

(54) BUSHING ASSEMBLY

(75) Inventors: Robert R. Schaser, Hampshire, IL (US); Jason D. Holt, St. Charles, IL (US); Albert W. Van Boven, Barrington, IL (US); Jeremy R. D. Tuttle, Dearborn, MI (US); Glenn G. Heavens, Chesire, CT (US)

(73) Assignee: Illinois Tool Works Inc., Glenview, IL (US)

( * ) Notice: Subject to any disclaimer, the term of this patent is extended or adjusted under 35 U.S.C. 154(b) by 43 days.

(21) Appl. No.: 13/254,778

(22) PCT Filed: Feb. 5, 2010

(86) PCT No.: PCT/US2010/023283
§ 371 (c)(1),
(2), (4) Date: Sep. 2, 2011

(87) PCT Pub. No.: WO2010/101693
PCT Pub. Date: Sep. 10, 2010

(65) Prior Publication Data
US 2011/0311333 A1    Dec. 22, 2011

Related U.S. Application Data

(60) Provisional application No. 61/157,458, filed on Mar. 4, 2009.

(51) Int. Cl.
| | |
|---|---|
| F16B 43/00 | (2006.01) |
| F16F 1/34 | (2006.01) |
| F16F 1/36 | (2006.01) |
| F16F 15/06 | (2006.01) |
| F16F 15/08 | (2006.01) |
| F16F 3/12 | (2006.01) |

(52) U.S. Cl.
USPC ........ 411/544; 411/347; 411/371.2; 411/531; 411/902; 411/154; 267/161; 248/576; 248/638

(58) Field of Classification Search
USPC ............. 411/347, 371.1, 371.2, 378, 531, 411/533, 544, 902, 903, 999, 154, 176, 361, 411/399, 424; 16/2.1; 248/562, 565, 576, 248/626, 627, 630, 632, 634, 638; 267/152, 267/153, 161, 162, 201, 257, 258, 280, 292; 403/228, 408.1
See application file for complete search history.

(56) References Cited

U.S. PATENT DOCUMENTS 2,915,152 A * 12/1959 Graham .................. 403/288
2,926,881 A * 3/1960 Painter ..................... 267/141.4

(Continued)

FOREIGN PATENT DOCUMENTS

| EP | 0399135 A1 | 11/1990 |
| JP | 61131588 U | 8/1986 |

(Continued)

OTHER PUBLICATIONS

ISR for PCT/US2010/023283 dated May 25, 2010.

(Continued)

*Primary Examiner* — Victor Batson
*Assistant Examiner* — Tyler Johnson
(74) *Attorney, Agent, or Firm* — Mark W. Croll; Paul F. Donovan

(57) ABSTRACT

A fastener assembly includes a bushing having a flange configured to be urged toward a work-piece, and an isolation spring configured to be positioned between the flange and the work-piece. The isolation spring includes a metal core integrally formed with a rubber coating.

15 Claims, 6 Drawing Sheets

U.S. PATENT DOCUMENTS

| | | | | |
|---|---|---|---|---|
| 2,979,350 | A * | 4/1961 | Lansky | 277/552 |
| 3,559,979 | A | 2/1971 | Muller | |
| 3,582,018 | A * | 6/1971 | Tirabassi | 244/1 R |
| 3,674,251 | A * | 7/1972 | Tirabassi | 267/162 |
| 4,071,041 | A * | 1/1978 | Moran et al. | 137/246.22 |
| 4,306,708 | A * | 12/1981 | Gassaway et al. | 267/141.3 |
| 4,365,556 | A * | 12/1982 | Reibel | 102/307 |
| 4,397,206 | A | 8/1983 | Czala | |
| 4,690,365 | A * | 9/1987 | Miller et al. | 248/650 |
| 4,732,519 | A * | 3/1988 | Wagner | 411/337 |
| 4,863,329 | A | 9/1989 | Wilson | |
| 5,080,335 | A * | 1/1992 | Solleder et al. | 267/141.4 |
| 5,348,267 | A * | 9/1994 | Lanting et al. | 248/635 |
| 5,397,206 | A | 3/1995 | Sihon | |
| 5,842,677 | A * | 12/1998 | Sweeney et al. | 248/635 |
| 6,059,503 | A * | 5/2000 | Johnson | 411/353 |
| 6,280,132 | B1 * | 8/2001 | Szczukowski et al. | 411/353 |
| 6,364,296 | B1 | 4/2002 | Cummings et al. | 267/141.4 |
| 6,491,279 | B1 * | 12/2002 | Iwano | 248/635 |
| 6,554,555 | B2 | 4/2003 | Imahigashi | 411/533 |
| 6,585,468 | B2 | 7/2003 | Johnson et al. | 411/353 |
| 6,702,503 | B2 * | 3/2004 | Pinzl | 403/200 |
| 6,974,121 | B2 * | 12/2005 | Koester et al. | 251/174 |
| 7,185,873 | B2 * | 3/2007 | Suka et al. | 248/635 |
| 7,334,571 | B1 | 2/2008 | Beardmore | |
| 7,682,117 | B2 * | 3/2010 | Holt et al. | 411/156 |
| 7,854,425 | B2 * | 12/2010 | Evans | 267/162 |
| 8,256,599 | B2 * | 9/2012 | Goto et al. | 192/85.24 |
| 2002/0136617 | A1 * | 9/2002 | Imahigashi | 411/533 |
| 2002/0187020 | A1 * | 12/2002 | Julien | 411/544 |
| 2003/0079311 | A1 * | 5/2003 | Yamamoto et al. | 16/2.1 |
| 2005/0211942 | A1 * | 9/2005 | Koester et al. | 251/315.01 |
| 2005/0220564 | A1 * | 10/2005 | Hinson et al. | 411/353 |
| 2008/0075403 | A1 | 3/2008 | Holt et al. | |
| 2009/0074539 | A1 * | 3/2009 | Mahdavi | 411/533 |
| 2009/0292363 | A1 * | 11/2009 | Goldfarb et al. | 623/17.16 |
| 2012/0075778 | A1 * | 3/2012 | Zhan | 361/679.01 |

FOREIGN PATENT DOCUMENTS

| | | |
|---|---|---|
| JP | 1218916 A | 9/1989 |
| JP | 2001-311399 | 11/2001 |
| JP | 2002-54440 A | 2/2002 |
| JP | 2002071025 A | 3/2002 |
| JP | 2004068835 A | 3/2004 |
| JP | 2005-082129 A | 3/2005 |
| JP | 2008116019 A | 5/2008 |
| JP | 2008255975 A | 10/2008 |
| WO | 2008039817 A1 | 4/2008 |

OTHER PUBLICATIONS

Office Action corresponding to JP2011-552958, dated Apr. 24, 2012.
A JP Office Action, dated Aug. 28, 2012, issued in JP Application No. 2011-552958.

* cited by examiner

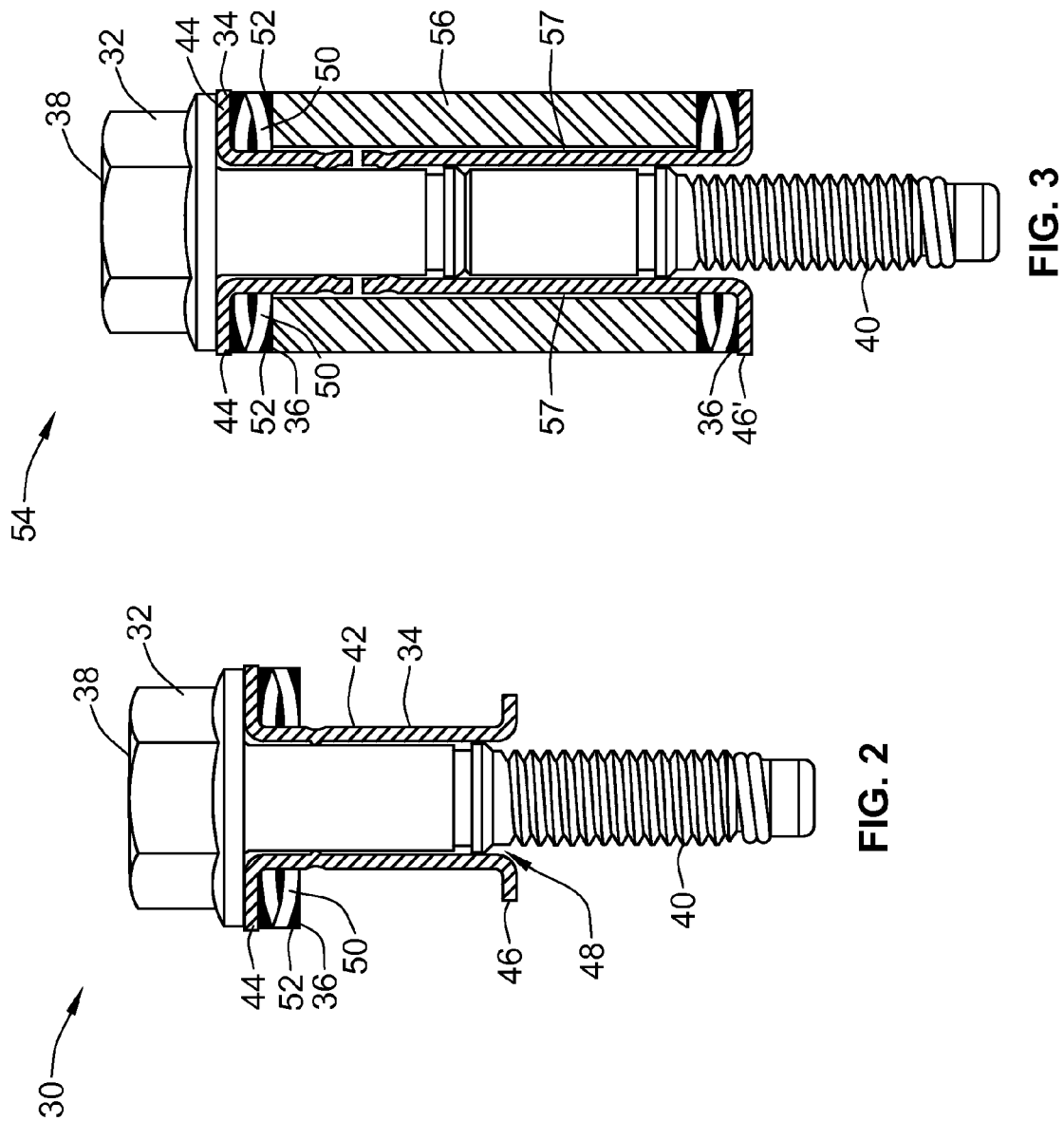

BUSHING ASSEMBLY

RELATED APPLICATIONS

This application is national phase of PCT/US2010/023283 filed Feb. 5, 2010, and claims priority benefits from U.S. Provisional Patent Application No. 61/157,458 entitled "Bushing Assembly," filed Mar. 4, 2009.

FIELD OF EMBODIMENTS OF THE INVENTION

Embodiments of the present invention generally relate to a fastener assembly, and more particularly, to a fastener assembly having a drawn metal bushing with a formed flange.

BACKGROUND

Fastener assemblies are used to secure various components together in a variety of applications. FIG. 1 illustrates a cross-sectional view of a conventional grommet assembly 10. The grommet assembly 10 includes a bolt 12 positioned within metal bushings 14. Each metal bushing 14 includes a generally flat flange 16 integrally connected to a hollow column 18, which is generally perpendicular to the flange 16. The columns 18 are positioned within a channel or opening 20 formed through a work-piece component 22 that is to be secured to and isolated from another component through the grommet assembly 10.

As shown in FIG. 1, separate and distinct rubber collars 24 are positioned between the flanges 16 and the work-piece component 22. As the bolt 12 is torqued into a tightened position, the flat flanges 16 compress the separate and distinct rubber collars 24. As the rubber in the collars 24 sets from standard loading, the amount of load the grommet assembly 10 provides is directly affected. Additionally, the rubber collars 24 may degrade and become weak over time. As the collars 24 permanently set, the effective amount of compression provided by the grommet assembly 10 is reduced. Accordingly, the grommet assembly 10 provides less load to the component 22 over time.

SUMMARY OF EMBODIMENTS OF THE INVENTION

Certain embodiments of the present invention provide a fastener assembly that includes a bushing having a flange configured to be urged toward a work-piece, and an isolation spring configured to be positioned between the flange and the work-piece. The isolation spring includes a metal core integrally formed with a rubber coating.

The isolation spring may be a wave spring. The rubber coating may be bonded to the metal core. Further, the rubber coating may completely encapsulate the metal core.

The bushing may include a central column integrally connected to the flange. An open-ended passage may be formed through the central column.

The assembly may further include a fastener positioned within the open-ended passage. The fastener may be a bolt having a head integrally connected to a threaded shaft.

The assembly may also include a second isolation spring. The bushing may include a second flange. The second isolation spring may be positioned on the second flange. In certain embodiments, only the isolation spring(s) contacts the work-piece.

Certain embodiments of the present invention also provide a fastener assembly that includes a bushing, first and second isolation springs, and a work-piece. The bushing includes first and second flanges integrally connected through a central column. The central column defines an open-ended passage. The first and second isolation springs abut the first and second flanges, respectively. Each isolation spring may include a metal wave-shaped core integrally formed with a rubber coating. The work-piece may be compressively sandwiched between the first and second isolation springs.

Certain embodiments of the present invention also provide a compressible isolation spring configured to be used with a fastener assembly. The isolation spring is configured to be compressively sandwiched between a fastener head or a bushing flange and a work-piece. The fastener assembly includes an annular metal core that may be wave-shaped, and a rubber coating bonded to the annular core. The annular metal core and the rubber coating are integrally formed as a single unitary piece. In certain embodiments, only the rubber coating directly contacts the work-piece, thereby dampening vibrations and minimizing corrosion. After the bonding process, the rubber coating may be inseparable from the metal core.

BRIEF DESCRIPTION OF SEVERAL VIEWS OF THE DRAWINGS

FIG. 2 illustrates a front cross-sectional view of a fastener assembly, according to an embodiment of the present invention.

FIG. 3 illustrates a front cross-sectional view of a fastener assembly, according to an embodiment of the present invention.

Figure 1:
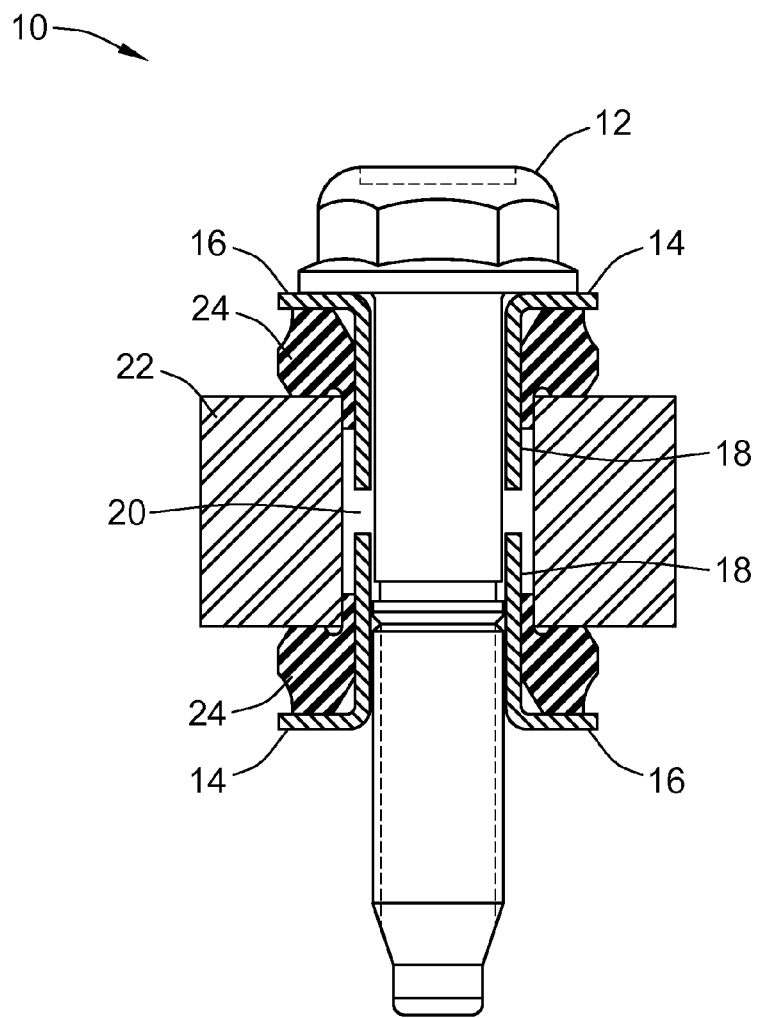
FIG. 1 illustrates a front cross-sectional view of a conventional grommet assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

FIG. 2 illustrates a front cross-sectional view of a fastener assembly 30, according to an embodiment of the present invention. The assembly 30 includes a bolt 32, a bushing 34, and an isolation spring 36. The bolt 32 includes a head 38 integrally connected to a threaded shaft 40.

The bushing 34 includes a central column 42 integrally connected to a top flange 44 and a bottom flange 46. The central column 42 includes a central open-ended passage 48 into which the shaft 40 of the bolt 32 passes. The flanges 44 and 46 are generally flat and perpendicular to the column 42. The bushing 34 is configured to compressively isolate a workpiece between the flanges 44 and 46.

The isolation spring 36 is positioned underneath the top flange 44 and is configured to be compressively sandwiched between the top flange 44 and an upper surface of a workpiece (not shown in FIG. 2). The isolation spring 36 includes a flexible metal core 50 that is bonded to a rubber coating 52. As such, the metal core 50 may be completely encapsulated by the rubber coating 52.

FIG. 3 illustrates a front cross-sectional view of a fastener assembly 54, according to an embodiment of the present invention. The fastener assembly 54 is similar to the assembly 30 shown in FIG. 2, except that the bushing 44 includes flanges 44 and 46' that are both sized to accommodate isolation springs 36. As the bolt 32 is tightened, the flanges 44 and 46' compress the isolation springs 36, which exert an isolating compression force into a work-piece 56 positioned therebetween.

As shown in FIG. 3, gaps 57 are formed between the column 42 of the bushing 34 and the work-piece 56. The work-piece 56 only makes contact with the isolation springs 36. As explained below, this configuration minimizes corrosion with respect to the metal components.

Figure 4:
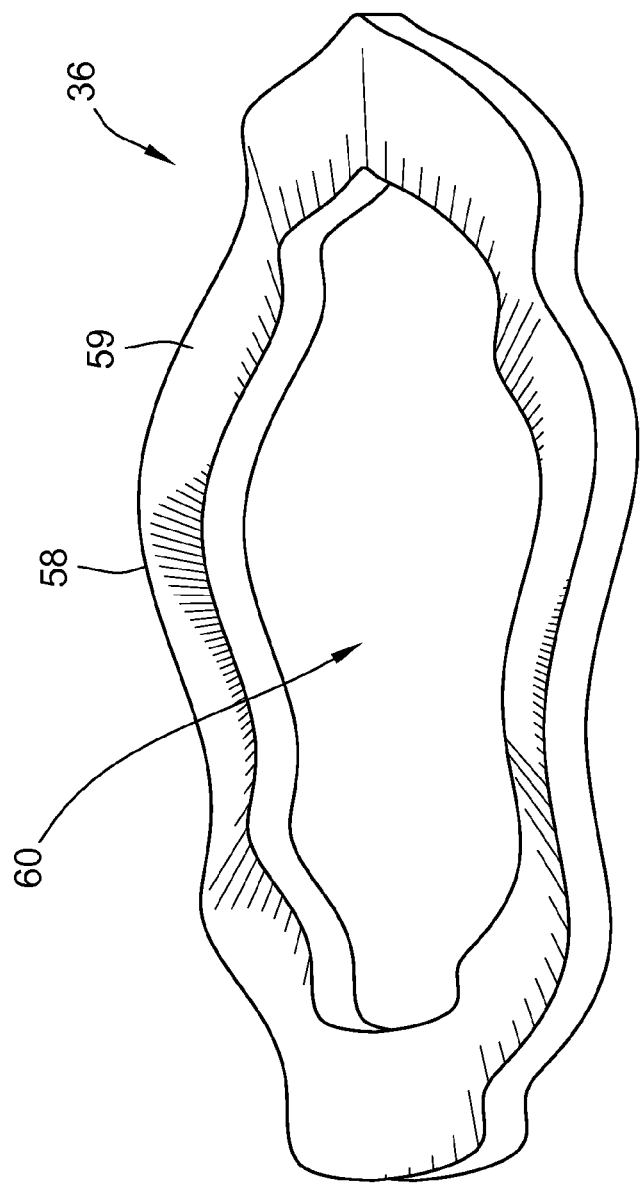
FIG. 4 illustrates a top view of an isolation spring, according to an embodiment of the present invention.
Figure 5:
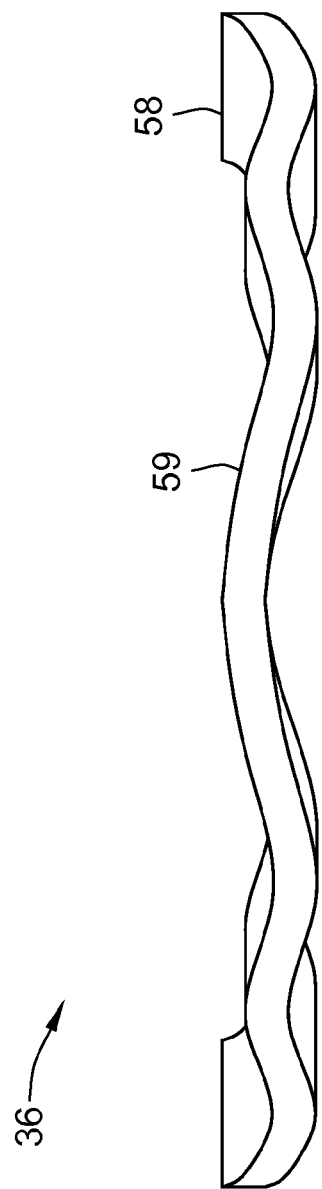
FIG. 5 illustrates a front view of an isolation spring, according to an embodiment of the present invention.

FIGS. 4 and 5 illustrate top and front views, respectively, of an isolation spring 36. Referring to FIGS. 4 and 5, the isolation spring 36 includes a main body 58 having an annular rim 59. The annular rim 59 is generally ring-shaped and defines a central opening 60. The annular rim 59 is not flat in its uncompressed state. As shown, the annular rim 59 is wavy due to the resilient metal spring core 50 (shown in FIGS. 2 and 3, for example). As noted above, the core 50 is bonded to the rubber coating 52 that may completely encapsulate the core 50. The metal core 50 may be various types of metal springs, such as a wave spring, a Belleville spring, or even a waved Belleville spring.

Referring to FIGS. 2-5, the isolation spring 36 compensates for tolerances, loading conditions, and provides noise/vibration/harshness (NVH) benefits due to the rubber coating 52 and integral metal spring core 50. In order to form the isolation spring 36, a standard rubber molding adhesive may be applied to the metal core 50 before the molding process. The metal core 50 is then placed in a rubber mold, and rubber is molded directly onto the metal and adhesive, thereby forming the rubber coating 52. Then, the entire isolation spring 36 is placed in an oven for a predetermined amount of time and temperature to cure the adhesive in order to strengthen the bond between the metal core 50 and the rubber coating 52.

The fastener assembly 30 isolates components, such as work-pieces, while at the same time minimizing the durability concerns of a pure rubber isolation system, such as shown in FIG. 1. The isolation spring 36 provides a system for damping and isolating vibrations through the integrally-formed rubber coating 52. In general, the isolation spring 36 provides the stiff spring rate required to limit system movement (through the metal core 50), with the isolation effects of rubber (through the rubber coating 52). Both of these benefits are realized in a single, unitary piece, that is, the isolation spring 36.

Figure 6:
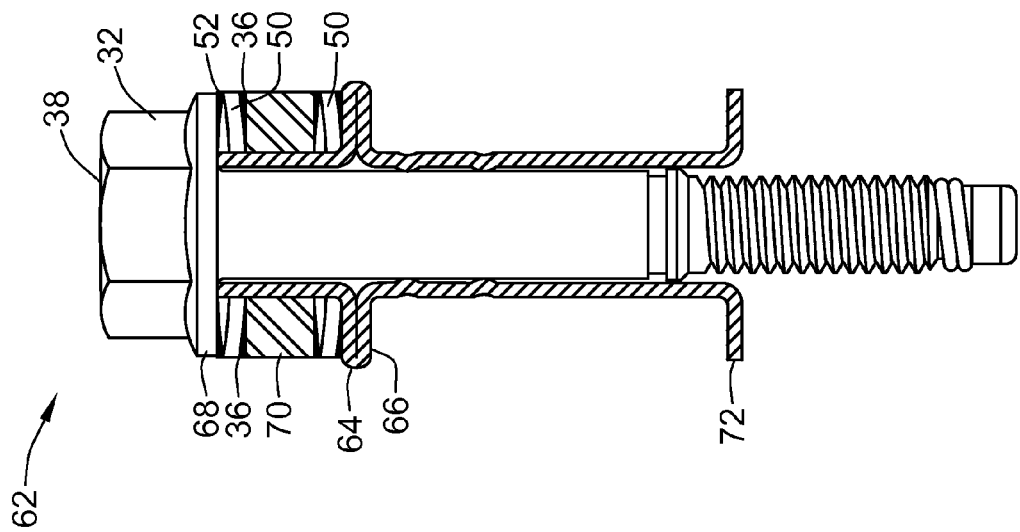
FIG. 6 illustrates a front cross-sectional view of a fastener assembly, according to an embodiment of the present invention.
Figure 7:
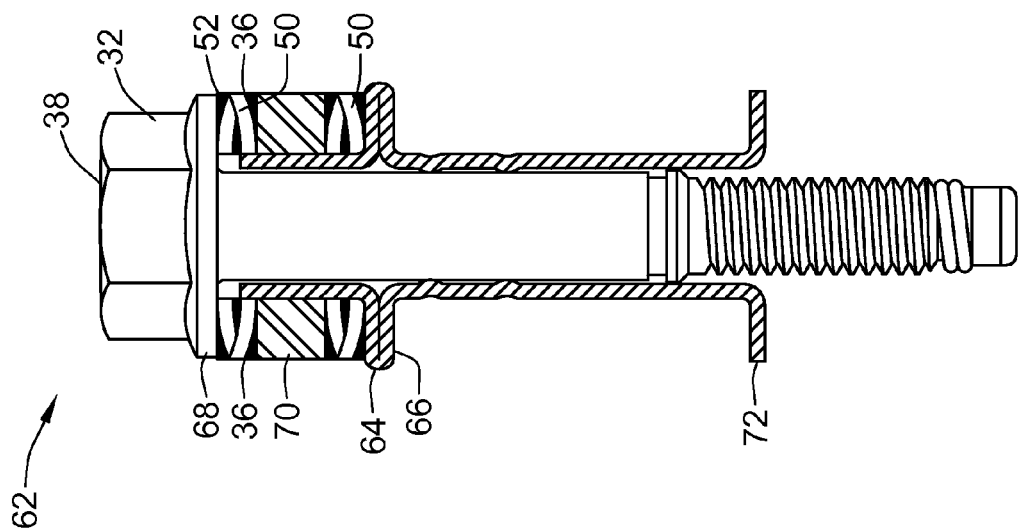
FIG. 7 illustrates a front cross-sectional view of a fastener assembly, according to an embodiment of the present invention.

FIGS. 6 and 7 illustrate front cross-sectional views of a fastener assembly 62, according to an embodiment of the present invention. The fastener assembly 62 is similar to those described in FIGS. 2-5, except that the bushing 64 includes an upper flange 66 formed below the top of the bushing 64. As such, one isolation spring 36 directly abuts a lower surface of a bolt collar 68, and another isolation spring 36 is positioned over the upper flange 66. The arrangement of the flanges of the bushing 64 accommodates work-pieces 70 of varying sizes. For example, one work-piece 70 may be positioned between the bolt head 38 and the upper flange 66 as shown. Additionally, or optionally, a separate and distinct work-piece (not shown) may be positioned between the upper flange 66 and a lower flange 72. The flange 66 may be located at different lengths of the bushing 64, depending on the size and shape of a work-piece to be isolated.

In FIG. 6, the fastener assembly 62 is in an at-rest, or non-compressed, state, while in FIG. 7, the bolt 32 is torqued into a tightened position. As the difference between FIGS. 6 and 7 shows, the metal cores 50 of the isolation springs 36 compress as the bolt 32 is tightened.

The fastener assemblies shown and described in FIGS. 2-7 provide a system in which the rubber coating 52 of the isolation spring 36 is not subjected to compression loading (as are the rubber collars 24 shown in FIG. 1). Instead, the rubber coating 52 is subjected to shear loading.

It has been found that rubber has increased longevity when loaded in shear, as opposed to compression. When rubber is thin, and its movement is limited due to a bond line, the rubber cannot flow freely and be compressed. For example, if rubber is sandwiched between two plates, and if the rubber is not bonded to either, the rubber can flow freely out the sides and then be compressed. However, if the rubber is bonded to the plates, the rubber cannot flow freely to the side. Because it is contained, the rubber cannot be compressed, so the loading the rubber experiences is shear direction loading. When rubber is loaded this way, as with embodiments of the present invention, it has been found that the rubber generally lasts much longer as compared to rubber in compression.

The embodiments of the present invention provide fastener assemblies that allow the bolt to move independently of the bushing without dislodging. When used as part of a fastener assembly, the isolation springs act as an isolator that may be the only component of the fastener assembly to come in direct contact with an isolated work piece. Consequently, the fastener assembly can isolate any metallic or plastic work piece without causing corrosion.

Any possible galvanic cell is eliminated because of the rubber contact. A galvanic cell occurs when different metals contact one another. One metal acts as an anode, which means electrodes migrate from the anode to the cathode, which is the other metal. When carbon steel and stainless steel are in contact with moisture, the carbon steel acts as the anode and slowly corrodes. The rubber coating 52 disposed between metal surfaces of the bushing flanges and/or bolt breaks the galvanic cell, thereby preventing corrosion.

Figure 8:
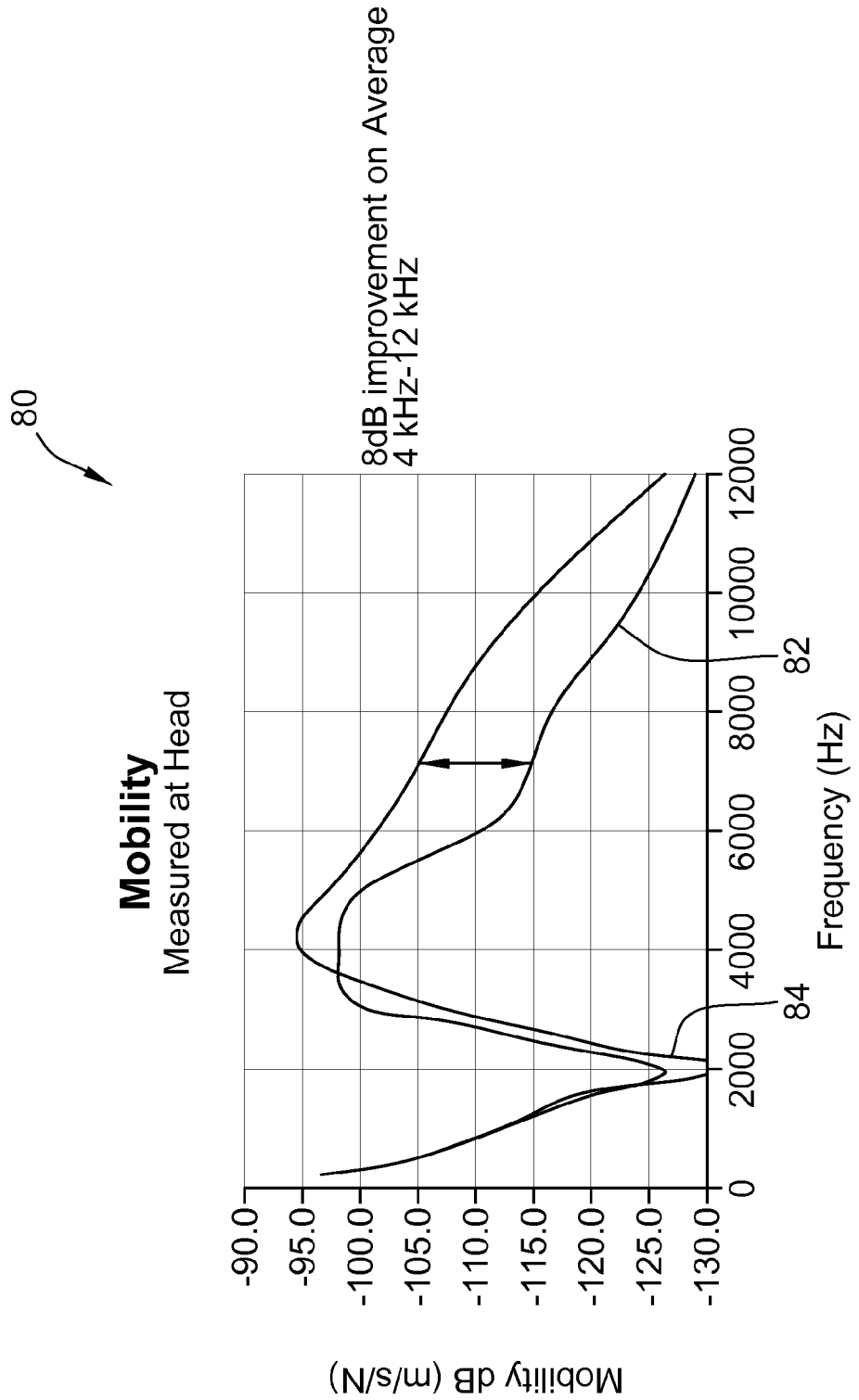
FIG. 8 illustrates a graph of mobility with respect to frequency response for a fastener assembly, according to an embodiment of the present invention.

FIG. 8 illustrates a graph 80 of mobility with respect to frequency response for a fastener assembly (such as those shown and described in FIGS. 2-7), according to an embodiment of the present invention. Line 82 represents the frequency and mobility response for a fastener assembly employing an isolation spring 36. Line 84 represents the frequency and mobility response for a conventional fastener assembly, such as shown in FIG. 1. The graph 80 represents an impact hammer test in which frequency response is integrated to obtain mobility. As shown, embodiments of the present invention provide an average 8 dB improvement over a conventional fastener assembly.

Thus, embodiments of the present invention provide a fastener assembly that overcomes the drawbacks of a conventional grommet assembly, such as shown and described in FIG. 1. The single-piece isolation springs 36 having a unitary construction of metal and rubber provide various benefits and advantages, as described above.

It has been found that embodiments of the present invention provide exceptional damping and vibration isolation. Further, embodiments of the present invention provide long-lasting, robust rubber isolation. Because the rubber coating 52 is bonded to the metal core 50, the rubber coating 52 is not subjected to compression loading, but, instead, shear loading. As such, the isolation spring 36 allows the fastener assemblies to experience near-zero permanent set over a lifetime.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener assembly comprising:
a bushing assembly comprising a flange configured to be urged toward a work-piece, wherein said bushing comprises a central column integrally connected to said flange, wherein said central column defines an open-ended passage; and
an isolation spring configured to be positioned between said flange and the work-piece, wherein said isolation spring comprises a metal core integrally formed with a rubber coating, wherein said isolation spring is shaped as a wave spring.

2. The fastener assembly of claim 1, wherein said rubber coating is bonded to said metal core.

3. The fastener assembly of claim 1, wherein said rubber coating encapsulates said metal core.

4. The fastener assembly of claim 1, further comprising a fastener positioned within said open-ended passage.

5. The fastener assembly of claim 4, wherein said fastener comprises a bolt having a head integrally connected to a threaded shaft.

6. The fastener assembly of claim 1, further comprising a second isolation spring, wherein said bushing comprises a second flange, and wherein said second isolation spring is positioned on said second flange.

7. The fastener assembly of claim 1, wherein only said isolation spring is configured to contact the work-piece.

8. The fastener assembly of claim 1, wherein no portion of said metal core is flat in an uncompressed state.

9. A fastener assembly comprising:
a bushing comprising first and second flanges integrally connected through a central column, wherein said central column defines an open-ended passage;
first and second isolation springs abutting said first and second flanges, respectively, wherein each of said first and second isolation springs comprises a metal wave-shaped core integrally formed with a rubber coating;
a work-piece compressively sandwiched between said first and second isolation springs.

10. The fastener assembly of claim 9, wherein said rubber coating is bonded to said metal core.

11. The fastener assembly of claim 9, wherein said rubber coating encapsulates said metal core.

12. The fastener assembly of claim 9, further comprising a fastener positioned within said open-ended passage.

13. The fastener assembly of claim 12, wherein said fastener comprises a bolt having a head integrally connected to a threaded shaft.

14. The fastener assembly of claim 9, wherein only said first and second isolation springs contact said work-piece.

15. The fastener assembly of claim 9, wherein no potion of said metal wave-shaped core is flat in an uncompressed state.

\* \* \* \* \*